(12) United States Patent
Ono (10) Patent No.: US 7,579,577 B2
(45) Date of Patent: Aug. 25, 2009

(54) IMAGE CAPTURING APPARATUS HAVING A FILTER SECTION DISPOSED ON PERIPHERY OF A LIGHT PASSING SECTION OF A PARTIAL WAVELENGTH SPECTRUM DIAPHRAGM SECTION

(75) Inventor: Shuji Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/050,500

(22) Filed: Mar. 18, 2008

(65) Prior Publication Data
US 2008/0308712 A1  Dec. 18, 2008

(30) Foreign Application Priority Data
Mar. 22, 2007  (JP)  ............................. 2007-075605
Dec. 27, 2007  (JP)  ............................. 2007-338185

(51) Int. Cl.
*H01L 27/00* (2006.01)
(52) U.S. Cl. .................................... 250/208.1; 250/226
(58) Field of Classification Search .............. 250/208.1, 250/226, 216, 237 R; 348/345–368, 234, 348/335; 356/73, 326; 359/354–356, 480
See application file for complete search history.

(56) References Cited

U.S. PATENT DOCUMENTS 4,172,227 A * 10/1979 Tyrer et al. ............... 250/461.2

FOREIGN PATENT DOCUMENTS

| JP | 2000-278701 A | 10/2000 |
|---|---|---|
| JP | 2001-275021 A | 10/2001 |

* cited by examiner

*Primary Examiner*—Que T Le
(74) *Attorney, Agent, or Firm*—Sughrue Mion, PLLC (57) ABSTRACT

An image capturing apparatus is provided that simultaneously captures a visible light image and an infra-red light image in which the same subject is in focus. The image capturing apparatus includes a light receiving section that receives light from a subject; a partial wavelength spectrum diaphragm section that is disposed between the subject and the light receiving section and that includes a light passing section that allows light in a first wavelength spectrum and light in a second wavelength spectrum to pass through and a filter section, which is disposed on a periphery of the light passing section, that allows the light in the first wavelength spectrum to pass through but does not allow the light in the second wavelength spectrum to pass through; and an image generating section that generates a first image based on the light in the first wavelength spectrum received by the light receiving section via the light passing section and the filter section and generates a second image based on the light in the second wavelength spectrum received by the light receiving section via the light passing section.

13 Claims, 6 Drawing Sheets

IMAGE CAPTURING APPARATUS HAVING A FILTER SECTION DISPOSED ON PERIPHERY OF A LIGHT PASSING SECTION OF A PARTIAL WAVELENGTH SPECTRUM DIAPHRAGM SECTION

CROSS REFERENCE TO RELATED APPLICATION

This patent application claims priority from Japanese patent application No. 2007-075605 filed on Mar. 22, 2007 and Japanese patent application No. 2007-338185 filed on Dec. 27, 2007, the contents of which are incorporated herein by reference.

BACKGROUND

1. Technical Field

The present invention relates to an image capturing apparatus. More particularly, the present invention relates to an image capturing apparatus that captures an image of a subject.

2. Related Art

In Japanese Patent Application Publication No. 2001-275021, an image capturing apparatus is proposed that uses the same photographic lens for capturing images in near infra-red light and for capturing images in visible light. In Japanese Patent Application Publication No. 2000-278701, an infra-red image capturing apparatus is proposed that displays a difference of wavelengths in the spectrum of infra-red light as a difference of color by prescribing to the wavelengths of infra-red light a red light spectrum, a green light spectrum, and a blue light spectrum, starting from the longer wave lengths of the infra-red light range to acquire primary color signals.

In both inventions described in Japanese Patent Application Publication No. 2001-275021 and Japanese Patent Application Publication No. 2000-278701, however, chromatic aberrations of the visible light and the infra-red light (near infra-red light) are not considered, and therefore there are cases in which the subject included in the image capturing area is out of focus in an image captured in visible light and an image captured in infra-red light.

SUMMARY

Therefore, it is an object of an aspect of the innovations herein to provide an image capturing apparatus, which is capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary apparatus may include an image capturing apparatus. The image capturing apparatus includes a light receiving section that receives light from a subject; a partial wavelength spectrum diaphragm section that is disposed between the subject and the light receiving section and that includes a light passing section that allows light in a first wavelength spectrum and light in a second wavelength spectrum to pass through and a filter section, which is disposed on a periphery of the light passing section, that allows the light in the first wavelength spectrum to pass through but does not allow the light in the second wavelength spectrum to pass through; and an image generating section that generates a first image based on the light in the first wavelength spectrum received by the light receiving section via the light passing section and the filter section and generates a second image based on the light in the second wavelength spectrum received by the light receiving section via the light passing section.

In the image capturing apparatus, the light receiving section may include a first light receiving section that receives the light in the first wavelength spectrum and a second light receiving section that receives the light in the second wavelength spectrum and is disposed at a position substantially the same as the first light receiving section in relation to the optical axis of the light from the subject. Furthermore, the image generating section may generate the first image based on the light in the first wavelength spectrum received by the first light receiving section via the light passing section and the filter section and generate the second image based on the light in the second wavelength spectrum received by the second light receiving section via the light passing section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

Through the present invention, a visible light image and an infra-red light image in which the same subject is in focus can be captured simultaneously.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
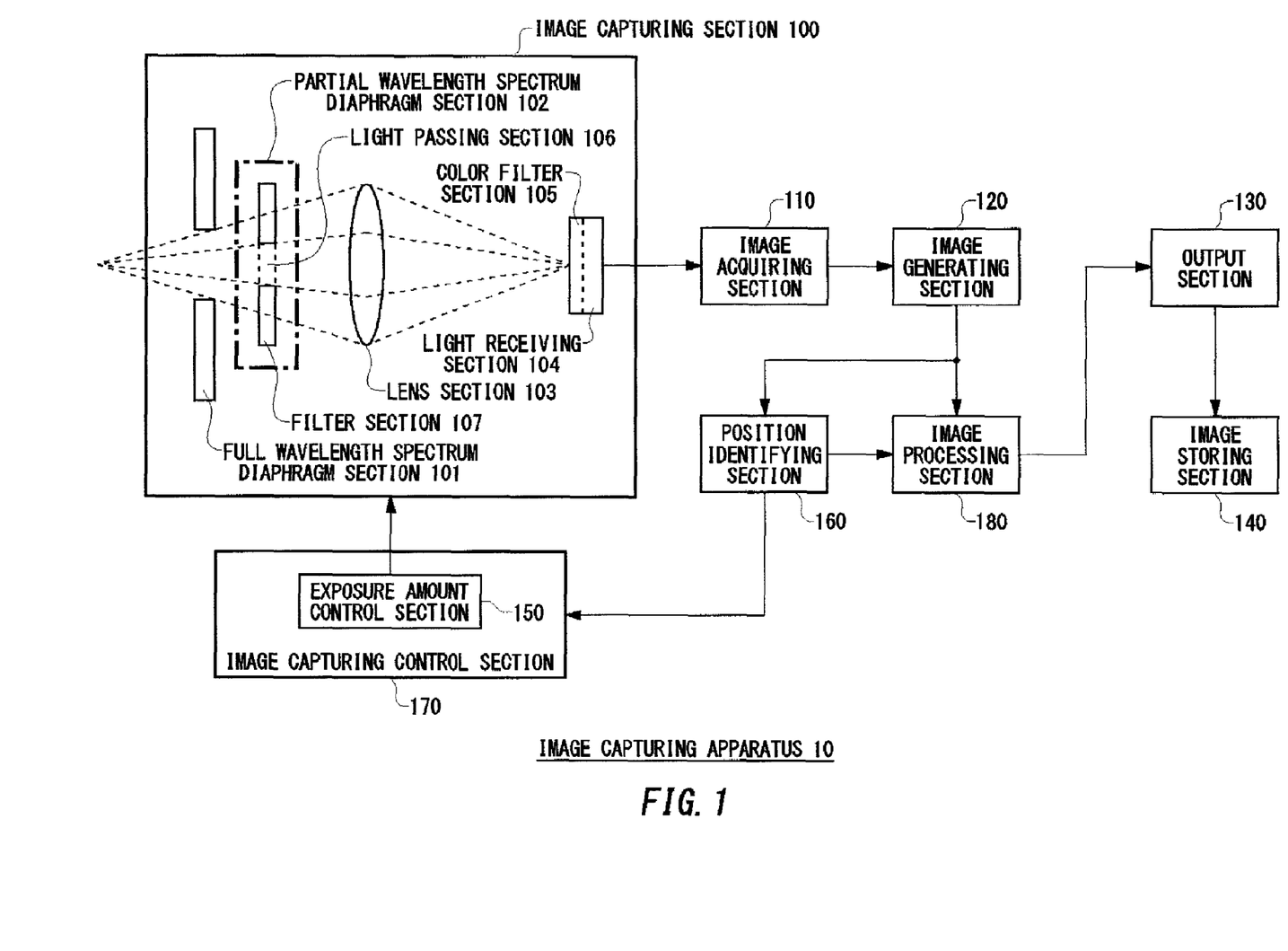
FIG. 1 is a block diagram that shows a functional configuration of an image capturing apparatus 10.

FIG. 1 shows an example of a functional configuration of an image capturing apparatus 10 according to an embodiment of the present invention. The image capturing apparatus 10 is provided with an image capturing section 100, an image acquiring section 110, an image generating section 120, an output section 130, an image storing section 140, a position identifying section 160, an image processing section 180, and an image capturing control section 170. The image capturing section 100 includes a full wavelength spectrum diaphragm section 101, a partial wavelength spectrum diaphragm section 102, a lens section 103, a light receiving section 104, and a color filter section 105. The partial wavelength spectrum diaphragm section 102 includes a light passing section 106 and a filter section 107. Furthermore, the light receiving section 104 includes a plurality of light receiving elements. The image capturing control section 170 includes an exposure amount control section 150. The image capturing apparatus 10 according to the present embodiment aims to simultaneously capture a visible light image and an infra-red light image in which the same subject is in focus.

The full wavelength spectrum diaphragm section 101 adjusts the amount of light from a subject that passes through the lens section 103. The full wavelength spectrum diaphragm section 101 adjusts the amount of light that passes through the lens section 103 by adjusting the size of an aperture of the lens section 103. The full wavelength spectrum diaphragm section 101 may be an aperture diaphragm that adjusts the amount of light passing through the lens section 103 in an optical system of the image capturing section 100. The full wavelength spectrum diaphragm section 101 reflects and/or absorbs visible light and infra-red light and includes a passing section that allows visible light and infra-red light to pass through, for example. Here, the passing section may have a circular or polygonal shape.

The partial wavelength spectrum diaphragm section 102 is disposed between the subject and the light receiving section 104. The light passing section 106 allows light in a first wavelength spectrum and light in a second wavelength spectrum to pass through. For example, the light passing section 106 may have a predetermined radius and may be an aperture disposed extending from a center of the partial wavelength spectrum diaphragm section 102 towards a periphery thereof. The filter section 107 is disposed on the periphery of the light passing section 106 and allows light in the first wavelength spectrum to pass through but does not allow light in the second wavelength spectrum to pass through. Here, the second wavelength spectrum is a range of wavelengths that are longer than those of the first wavelength spectrum. Specifically, the second wavelength spectrum may be an infra-red (Ir) light range (e.g., a range of wavelengths from 750 nm to 1000 nm) and the first wavelength spectrum may be a visible light range (e.g., a range of wavelengths from 400 nm to 750 nm).

The filter section 107 may be, for example, a light absorbing filter that absorbs light in the second wavelength spectrum but allows light in the first wavelength spectrum to pass through. In other words, the filter section 107 may be a filter that absorbs infra-red rays. Alternatively, the filter section 107 may be a light reflecting filter that reflects light in the second wavelength spectrum but allows light in the first wavelength spectrum to pass through. In other words, the filter section 107 may be a filter that reflects infra-red rays. The filter section 107 may include an infra-red ray absorbing material that allows light in the first wavelength spectrum to pass through but does not allow light in the second wavelength spectrum to pass through (e.g., azo-type, aminum-type, anthraquinone-type, cyanine-type, dimonium-type, dithiol metal complex-type, squarylium-type, naphthalocyanine-type, or phthalocyanine-type pigments). The filter section 107 may be formed by coating the peripheral portion of the lens section 103 with material that includes the infra-red light absorbing material.

In the present embodiment, an example is described in which the second wavelength spectrum is a range of longer wavelengths than the first wavelength spectrum, but in other embodiments, the first wavelength spectrum may be a range of longer wavelengths than the second wavelength spectrum. That is, the filter section 107 may be disposed on the periphery of the light passing section 106 and allow light in the second wavelength spectrum to pass through while not allowing light in the first wavelength spectrum to pass through. In yet other embodiments, the filter section 107 may allow at least one of an R component included in visible light (e.g., light having a wavelength in a range from 610 nm to 750 nm), a B component included in visible light (e.g., light having a wavelength in a range from 435 nm to 480 nm), a G component included in visible light (e.g., light having a wavelength in a range from 490 nm to 600 nm), and an infra-red light component to pass through while not allowing any of the other components to pass through.

The image capturing apparatus 10 may be further provided with a light measuring sensor that measures the amount of light in the image capturing region and the filter section 107 may include on the periphery of the light passing section 106 a first filter that does not allow the light of the first wavelength spectrum to pass through and a second filter that does not allow the light of the second wavelength spectrum to pass through in an interchangeable manner in order to change the wavelength of the light allowed to pass through depending on the amount of light detected by the light measuring sensor. The filter section 107 switches between the first filter and the second filter depending on the amount of light detected by the light measuring sensor. For example, when the amount of light detected by the light detecting sensor is greater than or equal to a predetermined amount of light, the filter section 107 uses the first filter to allow the light in the infra-red light range to pass through without allowing the light in the visible light range to pass through. On the other hand, when the amount of light detected by the light measuring sensor is less than a predetermined amount of light, the filter section 107 uses the second filter to allow both the light in the visible light range and the light in the infra-red light range to pass through.

By providing the image capturing apparatus 10 with the partial wavelength spectrum diaphragm section 102, a depth of field of light in the first wavelength spectrum and a depth of field of light in the second wavelength spectrum can be overlapped. In other words, even when the depth of field of the light in the first wavelength spectrum and the depth of field of the light in the second wavelength spectrum do not overlap in a case where the partial wavelength spectrum diaphragm section 102 does not include the filter section 107, by equipping the filter section 107 in the present embodiment, the light in the wavelength range that cannot pass through the filter section 107 comes together at a focal point. Accordingly, the depth of field of the light in the wavelength range that cannot pass through the filter section 107 is increased. In such a case, a region can be generated in which the light in the first wavelength spectrum and the light in the second wavelength spectrum are brought into focus by setting an arrangement of the filter section 107 to overlap the depth of field of the light that does not pass through the filter section 107 and the depth of field of the light that does pass through the filter section 107.

The lens section 103 images the light from the subject onto the light receiving section 104. The lens section 103 may be a lens system that includes a plurality of lenses. The light receiving section 104 receives the light from the subject. The light receiving section 104 is arranged in a region at which the light of the first wavelength spectrum and the light of the second wavelength spectrum are in focus. Here, a CCD (Charge Coupled Device) or a plurality of CMOS (Complementary Metal-Oxide Semiconductor) sensors are given as an example of the light receiving section 104.

The light receiving section 104 may include a first light receiving section that receives the light in the first wavelength spectrum and a second light receiving section that receives the light in the second wavelength spectrum and that is disposed at a position substantially the same as the first light receiving section in relation to the optical axis of the light from the subject. In such a case, one pixel of the CCD is given as an example of the first light receiving section or the second light receiving section. The first light receiving section may include a plurality of light receiving elements that receive the light from the subject, which is the light in the first wavelength spectrum. In the same manner, the second light receiving section may include a plurality of light receiving elements that receive the light in the second wavelength spectrum from the subject. It should be noted that the light receiving section 104 is not limited to the first light receiving section and the second light receiving section, and may further include a plurality of other light receiving sections.

The first light receiving section includes the color filter section 105 that causes light of a plurality of color components included in the light in the visible light range to be received by each of the plurality of light receiving elements. More specifically, the first light receiving section may include four light receiving elements, for example, such that each of the four light receiving elements receives light passed through a color filter section 105 disposed to correspond to one of the four light receiving elements. For example, the first light receiving section includes a first light receiving element, a second light receiving element, a third light receiving element, and a fourth light receiving element. A color filter section 105 that allows the R component to pass through is disposed substantially above the light receiving region of the first light receiving element, a color filter section 105 that allows the G component to pass through is disposed substantially above the light receiving region of the second light receiving element and the fourth light receiving element, a color filter section 105 that allows the B component to pass through is disposed substantially above the light receiving region of the third light receiving element. Here, the color filter sections 105 included in the first light receiving section 104 further include an infra-red cutting filter that does not allow light in the infra-red light range to pass through. On the other hand, the second light receiving section includes a visible light cutting filter that does not allow light in the visible light range to pass through.

In the image capturing section 100, the light entering from the image capturing region passes through the full wavelength spectrum diaphragm section 101, the partial wavelength spectrum diaphragm section 102, and the lens section 103 to be received by the light receiving section 104. The light receiving section 104 receives the light at the plurality of light receiving elements to capture the image of the subject included in the image capturing region. The light receiving section 104 receives the light passed through the color filter section 105 at the plurality of light receiving elements to capture the image of the subject included in the image capturing region. The exposure amount control section 150 causes the light from the subject to be received by the first light receiving section and the second light receiving section in a prescribed period (exposure period).

The exposure amount control section 150 may include an automatic exposure function, and in such a case, the length of the exposure period may be designated by the automatic exposure function. For example, an automatic exposing section may change the exposure period and/or the size of the diaphragm opening of the full wavelength spectrum diaphragm section 101 depending on the brightness of the image capturing region. The exposure amount control section 150 automatically adjusts the exposure amount of the image capturing section 100 to be an exposure amount with which an image can be captured in which the subject included in the image capturing region is clearly visible.

Here, the image captured in the present embodiment is a static image and/or a moving image that includes a plurality of moving image component images. The moving image component images may include any one of frame images, field images, or other captured images of various types that compose a moving image. The light receiving section 104 included in the image capturing section 100 supplies to the image acquiring section 110 an analog electrical signal made up of a charge generated by the light received by the plurality of light receiving elements.

The image acquiring section 110 reads the analog electrical signal from the plurality of light receiving elements included in the light receiving section 104. The image acquiring section 110 converts the read analog electrical signal into a digital signal in order to acquire the captured image of the image capturing region as captured image data. More specifically, the image acquiring section 110 extracts the analog electrical signal, which represents the captured image of the image capturing region captured by the image capturing section 100, by applying a process that decreases noise generated by the light receiving section 104 to the analog electrical signal read from the light receiving section 104. The image acquiring section 110 then adjusts the extracted analog electrical signal to be a predetermined level. Next, the image acquiring section 110 acquires the captured image data by converting the adjusted analog electrical signal into a digital signal. The image acquiring section 110 supplies the acquired captured image data to the image generating section 120.

It should be noted that the image acquiring section 110 may perform the process of converting the analog electrical signal into the digital signal after performing a gamma conversion. The image acquiring section 110 may extract from the analog electrical signal only the analog electrical signals of each color R, G, B and convert the extracted analog electrical signals into digital signals. Furthermore, when performing a data compression process to decrease the amount of data of the digital signal, the image acquiring section 110 may perform a white balance process to identify the reference value of white in the captured image.

Next, the image acquiring section 110 generates an image that shows brightness components and images that show color-difference components based on the RGB signals. The image acquiring section 110 extracts from the generated captured image a portion in which the signal change is larger than a predetermined reference value and performs a sharpness process (aperture correction). The image acquiring section 110 may then perform the data compression process on the captured image to which the sharpness process was applied.

The image generating section 120 generates a first image based on the light in the first wavelength spectrum received by the light receiving section 104 via the light passing section 106 and the filter section 107. The image generating section 120 also generates a second image based on the light in the second wavelength spectrum received by the light receiving section 104 via the light passing section 106. More specifically, the image generating section 120 generates the first image based on the light in the first wavelength spectrum received by the first light receiving section via the light passing section 106 and the filter section 107 and generates the second image based on the light in the second wavelength spectrum received by the second light receiving section via the light passing section 106.

To be even more specific, the image generating section 120 generates the first image based on the amount of light in the first wavelength spectrum received by the first light receiving section via the light passing section 106 and the filter section 107 in a prescribed period designated by the exposure amount control section 150. Furthermore, the image generating section 120 generates the second image based on the amount of light in the second wavelength spectrum received by the second light receiving section via the light passing section 106 in a prescribed period designated by the exposure amount control section 150. The image generating section 120 supplies the generated first and second images to the image processing section 180. The image processing section 180 applies an imaging process to the first and second images and supplies the processed images to the output section 130.

The output section 130 outputs the first and second images, to which the image process is applied by the image processing section 180, to an external image display apparatus (e.g., a monitor, a liquid crystal display, and the like), a printer, or the like. Here, in a case where the image capturing apparatus 10 is further provided with a display section that displays the image, the display section is given as an example of the output section 130. The output section 130 may output the first and second images to the external image display apparatus via a network such as the internet. Alternatively, the output section 130 may supply the first and second images to the image storing section 140. The image storing section 140 stores the first and second images generated by the image generating section 120.

The position identifying section 160 identifies a position of the subject based on a comparison result between a blur amount of the first image and a blur amount of the second image. Specifically, the position identifying section 160 identifies the position of the subject as being nearer a position of the object that emits light that forms an image at the position of the light receiving section 104 in a case where the difference between the blur amount of the first image and the blur amount of the second image is smaller. Here, the position of the subject can be indicated by the distance on the optical axis up to the subject, for example.

The image capturing control section 170 may control image capturing by the image capturing section 100 depending on the position of the subject identified by the position identifying section 160. For example, the image capturing control section 170 may perform focus control, exposure control, or the like depending on the position of the subject identified by the position identifying section 160. Furthermore, the image processing section 180 may apply image processes to the first and second images, including an accentuation process such as edge enhancement, an image restoration process such as blur correction, or the like depending on the position of the subject identified by the position identifying section 160. For example, the image processing section 180 may apply a predetermined image process to the first and second images depending on the position of the subject. The image processing section 180 may further perform an image analysis process such as object extraction and movement analysis depending on the position of the subject identified by the position identifying section 160. For example, the image processing section 180 may perform object extraction and movement analysis in an image region in which the subject positioned at a prescribed distance is captured. The output section 130 may include the position of the subject identified by the position identifying section 160 in at least one of the first and second images. The output section 130 may also include an image analysis result by the image processing section 180 in at least one of the first and second images.

By using the image capturing apparatus 10 according to the present embodiment, the light of at least one wavelength is cut from among the plurality of wavelengths included in the light from the subject, and the light having the remaining wavelengths can be received by the plurality of light receiving elements. Therefore, images in which light having a plurality of wavelengths is easily brought into focus can be simultaneously captured because the depths of field of the light having the plurality of wavelengths can be overlapped with each other.

Figure 2:
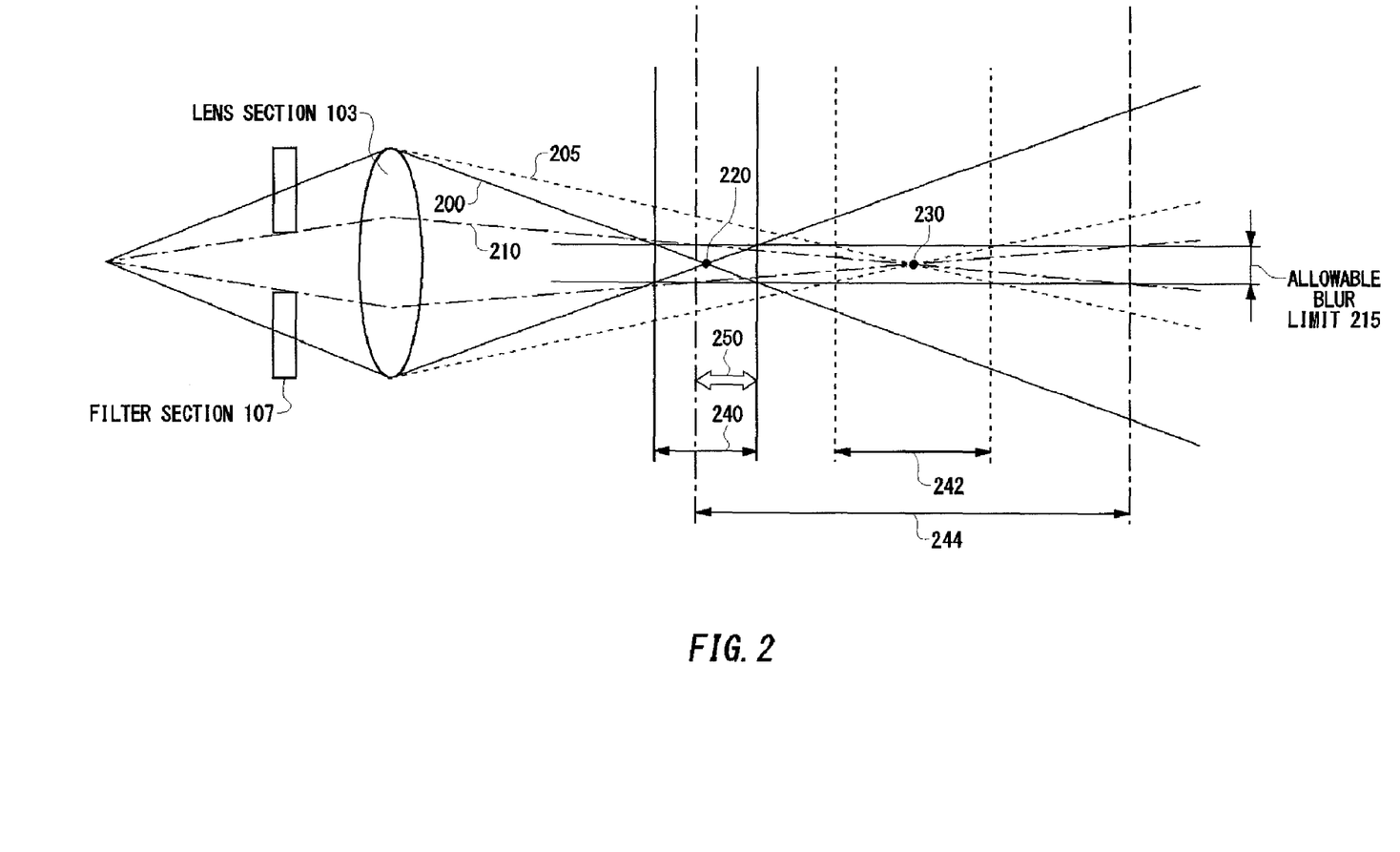
FIG. 2 shows a function of a partial wavelength spectrum diaphragm section 102.

FIG. 2 shows an exemplary function of the partial wavelength spectrum diaphragm section 102 according to the present embodiment. In the description of FIG. 2, the filter section 107 allows light from the subject in the visible light range to pass through but does not allow light from the subject in the infra-red light range to pass through. The visible light is shown by a solid line of a light path 200 and passes through the filter section 107 and the lens section 103 to come together at a focal point position 220. A distance range in which the light in the visible light range is in focus is represented by the depth of field 240 in which the blur of the optical image settles within an allowable blur limit 215 allowed by a user or maker of the image capturing apparatus 10.

Here, when there is no filter section 107, the light in the infra-red light range is represented by the dotted line of the light path 205 and passes through the lens section 103 to come together at a focal point position 230. The distance range in which the light in the infra-red light range is in focus when the filter section 107 is not present is represented by a depth of field 242 in which the blur of the optical image settles to be within the allowable blur limit 215. Accordingly, when the filter section 107 is not present, the depth of field 240 in which the light in the visible light range is in focus and the depth of field 242 in which the light in the infra-red light range is in focus do not overlap. Therefore, a visible light image and an infra-red light image in which the same subject is in focus cannot be simultaneously captured unless the light receiving section 104 is moved within both the range of the depth of field 240 and the range of the depth of field 242 to capture the image of the image capturing region at both positions.

When the filter section 107 is equipped, however, the light in the infra-red light range does not pass through the filter section 107, so that the infra-red light proceeds along a path indicated by the dotted line of the light path 210 and comes together at the focal point position 230. In such a case, the light in the infra-red light range represented by the light path 210 comes to a focal point through the filter section 107 and a range of distance in which the light of the infra-red light range is in focus is enlarged from the depth of field 242 to the depth of field 244, even when a designation is made that the blur of the optical image fall within the allowable blur limit 215. Therefore, when the light receiving section 104 is arranged in a range 250 in which the depth of field 240 and the depth of field 244 overlap, the visible light image in which the light from the subject in the visible light range is in focus and the infra-red light image in which the light from the same subject in the infra-red light range is in focus can simultaneously be captured.

The filter section 107 in the present embodiment does not allow light in the infra-red light range to pass, but in other embodiments, the filter section 107 may allow light in the infra-red light range to pass while not allowing light in a prescribed range of the visible light range to pass. In such a case, the depth of field of the light in the wavelength range that does not pass through the filter section 107 is greater than the depth of field of the light in the wavelength range that does pass through the filter section 107. By positioning the light receiving section 104 within a range in which the aforementioned depth of field and the depth of field of the light in the infra-red light range overlap, the visible light image in which the light from the subject in the visible light range is in focus and the infra-red light image in which the light from the subject in the infra-red light range is in focus can be captured simultaneously.

For example, the filter section 107 may allow R component light, B component light, and light of the infra-red light component to pass through while not allowing G component light, which has the highest luminosity, to pass through. In such a case, the light receiving section 104 may be arranged within a range in which the depth of field designated by the G component light and the depth of field designated by the light of the infra-red light component overlap.

The image capturing apparatus 10 according to the present embodiment can overlap the depths of field of the light in the visible light range and the light in the infra-red light range, and can therefore easily capture an image in which the effects of chromatic aberrations are removed, in other words, simultaneously capture the visible light image and the infra-red light image, without configuring a lens system with a complicated combination of a plurality of lenses. By doing this, the image capturing apparatus 10 can be manufactured with a simpler configuration and at a lower cost.

Figure 3:
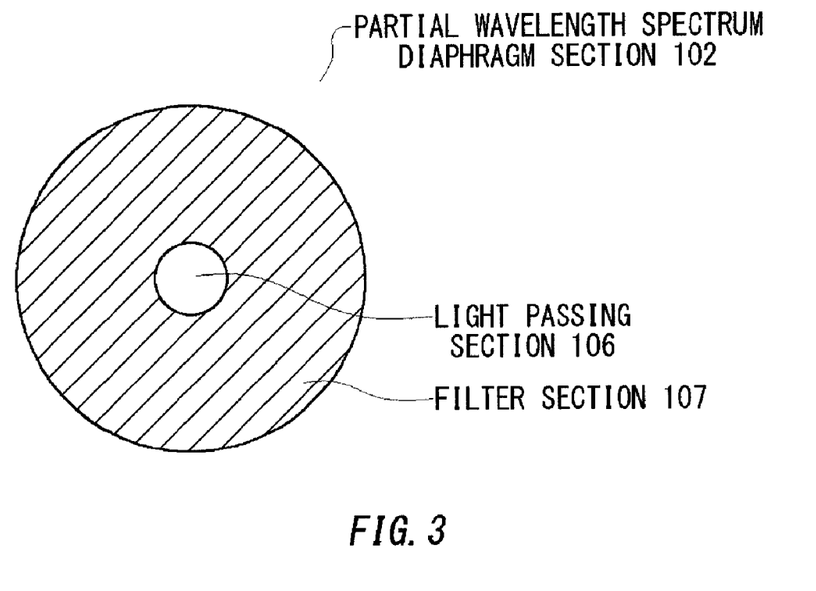
FIG. 3 shows the partial wavelength spectrum diaphragm section 102.

FIG. 3 shows an example of the partial wavelength spectrum diaphragm section 102 according to the present embodiment. The partial wavelength spectrum diaphragm section 102 includes the filter section 107 that allows light in the first wavelength spectrum to pass through but does not allow light in the second wavelength spectrum to pass through. The partial wavelength spectrum diaphragm section 102 includes the light passing section 106, which allows the light in the first wavelength spectrum and the light in the second wavelength spectrum to pass through, spanning from the center thereof towards the periphery a prescribed distance. The partial wavelength spectrum diaphragm section 102 may be substantially ring-shaped, for example. Alternatively, the outer circumference of the partial wavelength spectrum diaphragm section 102 may be polygonal. Furthermore, the light passing section 106 may be a hole or may use a material that allows both the light in the first wavelength spectrum and the light in the second wavelength spectrum to pass through.

In the present embodiment, the light passing section 106 has a substantially circular shape, but the light passing section 106 may also be polygonal in shape. The filter section 107 may allow the light in the second wavelength spectrum to pass through and may also allow light in at least one wavelength range to pass through from among the plurality of wavelength ranges included in the first wavelength spectrum while not allowing light in the other wavelength ranges in the first wavelength spectrum to pass through. Furthermore, the filter section 107 may include a plurality of filter sections, each of which not allowing light in a predetermined wavelength range to pass through, and may switch the filter section according to the measurement result of the light measuring sensor.

Figure 4:
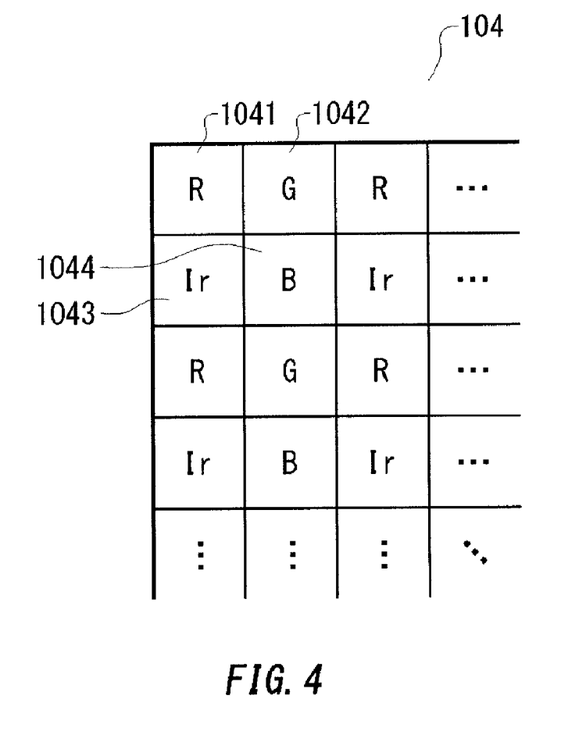
FIG. 4 shows a light receiving section 104.

FIG. 4 shows an example of the light receiving section 104 according to the present embodiment. The light receiving section 104 includes a plurality of light receiving elements. More specifically, the light receiving section 104 includes a plurality of light receiving element units, where each light receiving element unit includes a grouping of a light receiving element 1041, a light receiving element 1042, a light receiving element 1043, and a light receiving element 1044. For example, a color filter section 105 that allows R component light to pass through is arranged above a light receiving surface of the light receiving element 1041. A color filter section 105 that allows G component light to pass through is arranged above a light receiving surface of the light receiving element 1042. A color filter section 105 that allows B component light to pass through is arranged above a light receiving surface of the light receiving element 1044. A color filter section 105 that allows Ir component light to pass through is arranged above a light receiving surface of the light receiving element 1043. A color filter section 105 that absorbs or reflects Ir component light is further arranged above each of the light receiving element 1041, light receiving element 1042, and light receiving element 1044.

The light receiving element 1041, the light receiving element 1042, the light receiving element 1043, and the light receiving element 1044 each supply to the image acquiring section 110 an analog electrical signal made up of the charge generated by the light received by each of the light receiving elements. By doing this, a visible light image is generated based on the analog electrical signals made up of the charges generated by the light received by each of the light receiving element 1041, the light receiving element 1042, and the light receiving element 1044, and, at the same time that the visible light image is generated, an infra-red light image is generated based on the analog electrical signal made up of the charge generated by the light received by the light receiving element 1043.

Figure 5:
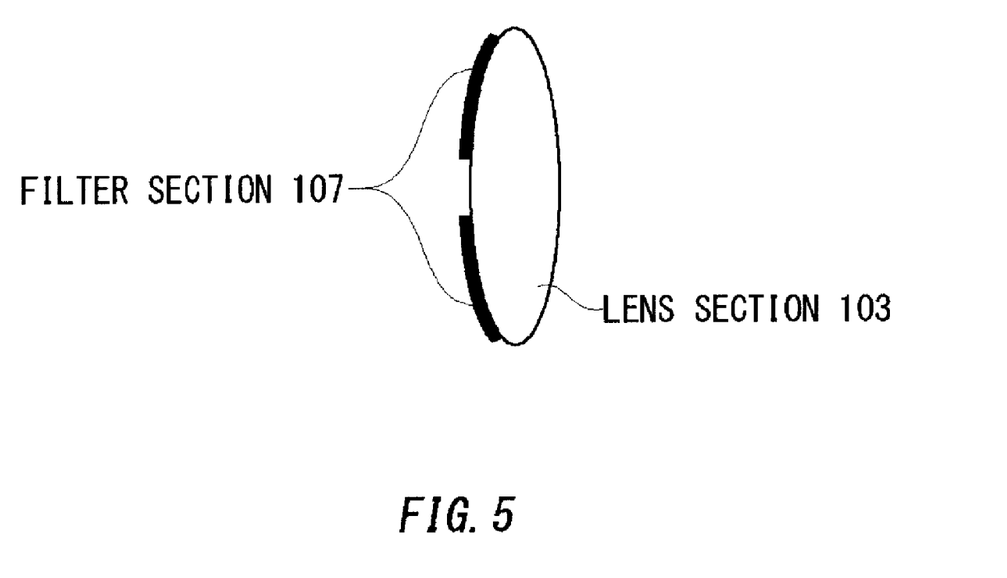
FIG. 5 shows a filter section 107.

FIG. 5 shows an example of the filter section 107 according to the present embodiment. In the present embodiment, the filter section 107 is formed by coating the outer peripheral portion of the lens section 103. In this case, the region on the surface of the lens section 103 into which the light enters that is not coated by the filter section 107 corresponds to the light passing section 106 in the above descriptions of FIGS. 1 to 4. The filter section 107 may be a coating material that absorbs or reflects the light in the infra-red light range, for example. Because the peripheral section of the lens section 103 is coated with an infra-red light absorbing film that absorbs the light in the infra-red light range or with an infra-red light reflecting film that reflects the light in the infra-red light range, the depth of field of the infra-red light is increased so that the infra-red light and the visible light can both be brought into focus.

Figure 6:
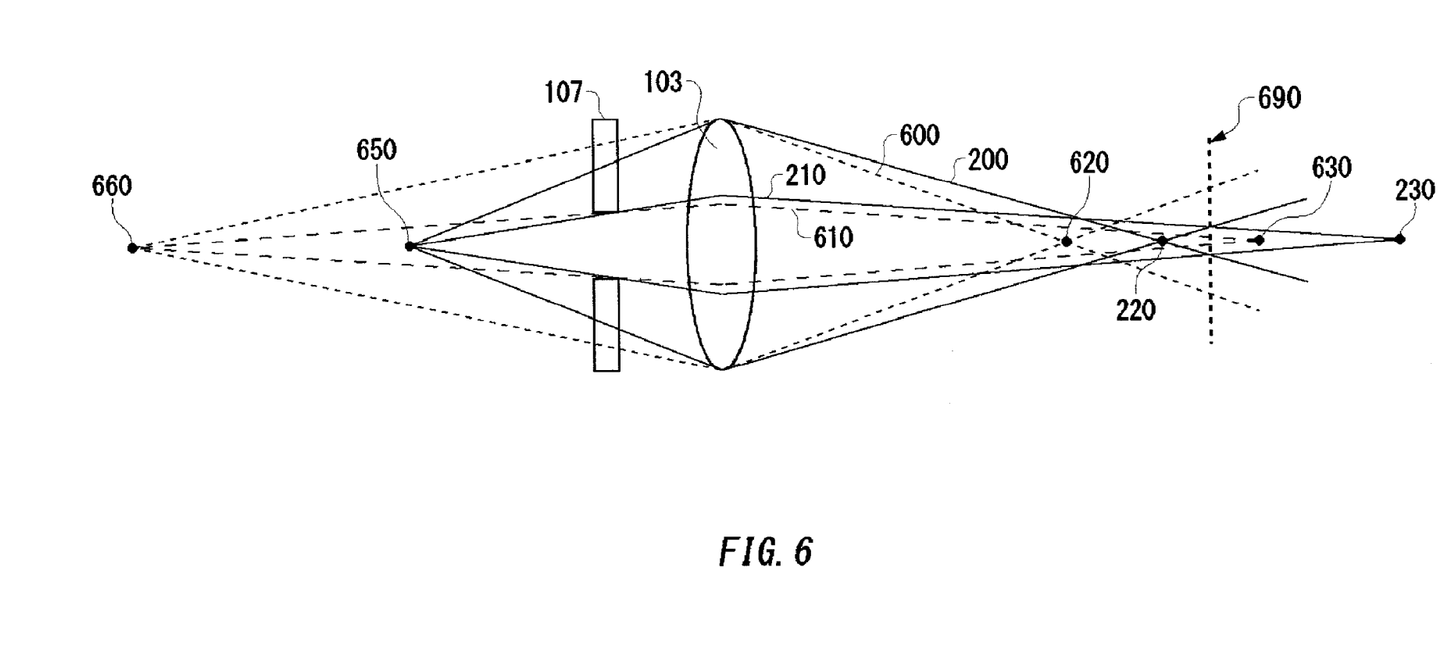
FIG. 6 shows a difference in blur amount caused by a difference in a position of an object.

FIG. 6 shows a difference in blur amount caused by a difference in the position of the object. As described in relation to FIG. 2, the visible light from an object point 650 comes together at the focal point position 220 as shown by the line of the light path 200. On the other hand, the infra-red light from the object point 650 follows along a path represented by the line of the light path 210 and comes together at the focal point position 230. As shown in FIG. 6, when the light receiving section 104 is disposed at a position on the optical axis represented by the reference numeral 690, it is expected that the blur amount of the infra-red light image and the blur amount of the visible light image will be substantially equal in the subject image of the subject positioned near the object point 650 on the optical axis.

On the other hand, the visible light from the object point 660 separated from the object point 650 comes together at the focal point position 620 as shown by the line of the light path 600. Furthermore, the infra-red light from the object point 660 follows along the path shown by the line of the light path 610 to come together at the focal point position 630. As made clear from the trajectories of the light rays shown in FIG. 6, the blur amount of the image of the subject positioned near the object point 660 is greater in the visible light image than in the infra-red light image. Accordingly, when the difference between the blur amount included in the subject image in the visible light image and the blur amount included in the subject image in the infra-red light image is smaller, the position identifying section 160 can identify the position of the subject to be nearer a position on the optical axis (e.g., a position of the object point 650) at which light can be emitted that substantially focuses at a position where the light receiving section 104 is disposed.

Figure 7:
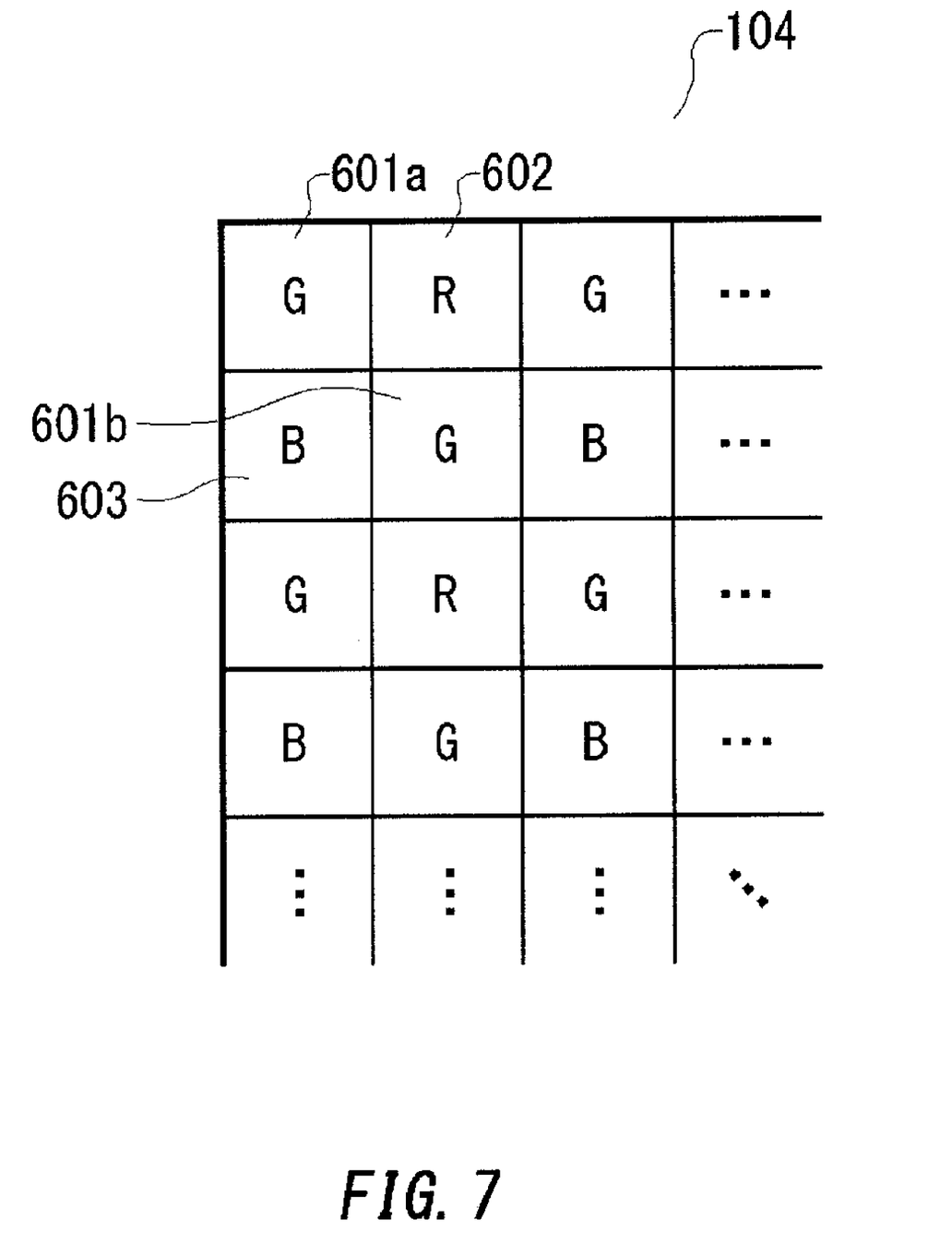
FIG. 7 shows another example of the light receiving section 104.

FIG. 7 shows another example of the light receiving section 104 according to the present embodiment. Here, the function and operation of the image capturing apparatus 10 is described with a wavelength spectrum of blue and red light given as an example of the first wavelength spectrum and a wavelength spectrum of green light given as an example of the second wavelength spectrum. The filter section 107 allows light in the red and blue wavelength spectrums to pass through but does not allow light in the green wavelength spectrum to pass through. In this manner, the function and operation of the filter section 107 in the present configuration is identical to the function and operation of the filter section 107 described in relation FIG. 3 and FIG. 5 except that the wavelength spectrum of the light allowed to pass through is different, and therefore a detailed description is omitted.

The light receiving section 104 includes a plurality of light receiving element units, each light receiving element unit including a grouping of a light receiving element 601a, a light receiving element 601b (referred to hereinafter collectively as the light receiving elements 601), a light receiving element 602, and a light receiving element 603. For example, the color filter section 105 that allows G component light to pass through is arranged above a light receiving surface of the light receiving element 601. The color filter section 105 that allows R component light to pass through is arranged above a light receiving surface of the light receiving element 602. The color filter section 105 that allows B component light to pass through is arranged above a light receiving surface of the light receiving element 603. Here, the color filter sections 105 may have transparency characteristics that do not allow Ir component light to pass through. In this manner, the density of the light receiving elements 601 included in the light receiving section 104 is greater than the density of the light receiving elements 602 included in the light receiving section 104. Furthermore, the density of the light receiving elements 601 included in the light receiving section 104 is greater than the density of the light receiving elements 603 included in the light receiving section 104.

Each light receiving element 601, light receiving element 602, and light receiving element 603 supplies to the image acquiring section 110 an analog electrical signal based on the charge generated by the light received by each of the light receiving elements. The image generating section 120 generates a certain visible light image based on the analog electrical signals generated according to the light received by each light receiving element 601, light receiving element 602, and light receiving element 603. In this way, with the image capturing apparatus 10 configured as described in relation to FIG. 7, the focal depth of the G component light, which has the greatest luminosity, is enlarged. Accordingly, by using the image capturing apparatus 10 having the present configuration, a captured visible light image can be provided in which the depth of field is substantially increased.

Furthermore, by using the image capturing apparatus 10 having the present configuration, the density of the light receiving elements 602 that receive the R component light and the density of the light receiving elements 603 that receive the B component light are lower than the density of the light receiving elements 601 that receive the G component light. However, the R component light and the B component light have a large point spread at a position of the light receiving section 104 compared to the G component light. Accordingly, the decrease in resolution caused by the densities of the light receiving elements 602 and the light receiving elements 603 being less than the density of the light receiving elements 601 is substantially decreased. On the other hand, by arranging the light receiving elements 601 that receive the G component light, which has the smaller point spread, to have a density greater than that of the light receiving elements 602 and the light receiving elements 603, the high resolution G component light can be effectively received. In this way, by using the image capturing apparatus 10 having the present configuration, the light receiving surface can be used effectively in accordance with the point spread. Accordingly, by using the image capturing apparatus 10 having the present configuration, a miniaturized image capturing apparatus can be provided without sacrificing a significant amount of resolution and focal depth.

It should be noted that infra-red light absorbing glass may be used on the peripheral section of the lens section 103. More specifically, the image capturing apparatus 10 in such a case can increase the depth of field of the light in the infra-red light range, without being provided with the partial wavelength spectrum diaphragm section 102 shown in FIG. 1, by having the infra-red light absorbing glass disposed on a region of the peripheral section of the lens section 103.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An image capturing apparatus, comprising:
a light receiving section that receives light from a subject;
a partial wavelength spectrum diaphragm section that is disposed between the subject and the light receiving section and that includes a light passing section that allows light in a first wavelength spectrum and light in a second wavelength spectrum to pass through and a filter section, which is disposed on a periphery of the light passing section, that allows the light in the first wavelength spectrum to pass through but does not allow the light in the second wavelength spectrum to pass through; and
an image generating section that generates a first image based on the light in the first wavelength spectrum received by the light receiving section via the light passing section and the filter section and generates a second image based on the light in the second wavelength spectrum received by the light receiving section via the light passing section.

2. The image capturing apparatus according to claim 1, wherein the light receiving section includes:
a first light receiving section that receives the light in the first wavelength spectrum; and
a second light receiving section that receives the light in the second wavelength spectrum and is disposed at a position substantially the same as the first light receiving section in relation to the optical axis of the light from the subject, the image capturing apparatus wherein the image generating section generates the first image based on the light in the first wavelength spectrum received by the first light receiving section via the light passing section and the filter section and generates the second image based on the light in the second wavelength spectrum received by the second light receiving section via the light passing section.

3. The image capturing apparatus according to claim 2, further comprising an exposure control section that causes the first light receiving section and the second light receiving section to receive the light from the subject in a prescribed period, the image capturing apparatus wherein the image generating section generates the first image based on an amount of light in the first wavelength spectrum received by the first light receiving section in the prescribed period via the light passing section and the filter section and generates the second image based on an amount of light in the second wavelength spectrum received by the second light receiving section in the prescribed period via the light passing section.

4. The image capturing apparatus according to claim 1, wherein the second wavelength spectrum is a range including wavelengths longer than the wavelengths in the first wavelength spectrum.

5. The image capturing apparatus according to claim 4, wherein the second wavelength spectrum is an infra-red light range and the first wavelength spectrum is a visible light range.

6. The image capturing apparatus according to claim 2, wherein the first light receiving section includes:
 a plurality of light receiving elements that receive the light from the subject; and
 a color filter section that causes a plurality of color components included in light in a visible light range to be received respectively by the plurality of light receiving elements.

7. The image capturing apparatus according to claim 1, wherein the filter section is a light absorbing filter that absorbs the light in the second wavelength spectrum and allows the light in the first wavelength spectrum to pass through.

8. The image capturing apparatus according to claim 1, wherein the filter section is a light reflecting filter that reflects the light in the second wavelength spectrum and allows the light in the first wavelength spectrum to pass through.

9. The image capturing apparatus according to claim 1, further comprising a lens section that images the light from the subject on the light receiving section, the image capturing apparatus wherein the filter section is a material that coats the lens section and that allows the light in the first wavelength spectrum to pass through but does not allow the light in the second wavelength spectrum to pass through.

10. The image capturing apparatus according to claim 2, further comprising a position identifying section that identifies a position of the subject based on a comparison result between a blur amount of the first image and a blur amount of the second image.

11. The image capturing apparatus according to claim 10, wherein the position identifying section identifies the position of the subject as being closer to a position of an object that emits light that provides an image at a position of the light receiving section when a difference between the blur amount of the first image and the blur amount of the second image is smaller.

12. The image capturing apparatus according to claim 1, wherein
 the light receiving section includes:
 a plurality of first light receiving elements that receive the light in the first wavelength spectrum; and
 a plurality of second light receiving elements that receive the light in the second wavelength spectrum, and
 the second light receiving elements have a density greater than the density of the first light receiving elements.

13. The image capturing apparatus according to claim 12, wherein the first wavelength spectrum is a green wavelength range and the second wavelength spectrum is a blue wavelength range or a red wavelength range.

* * * * *